June 25, 1940. W. E. HAUPT Re. 21,488
TOY RAILWAY SWITCH THROWING MECHANISM
Original Filed Aug. 8, 1928 2 Sheets-Sheet 1
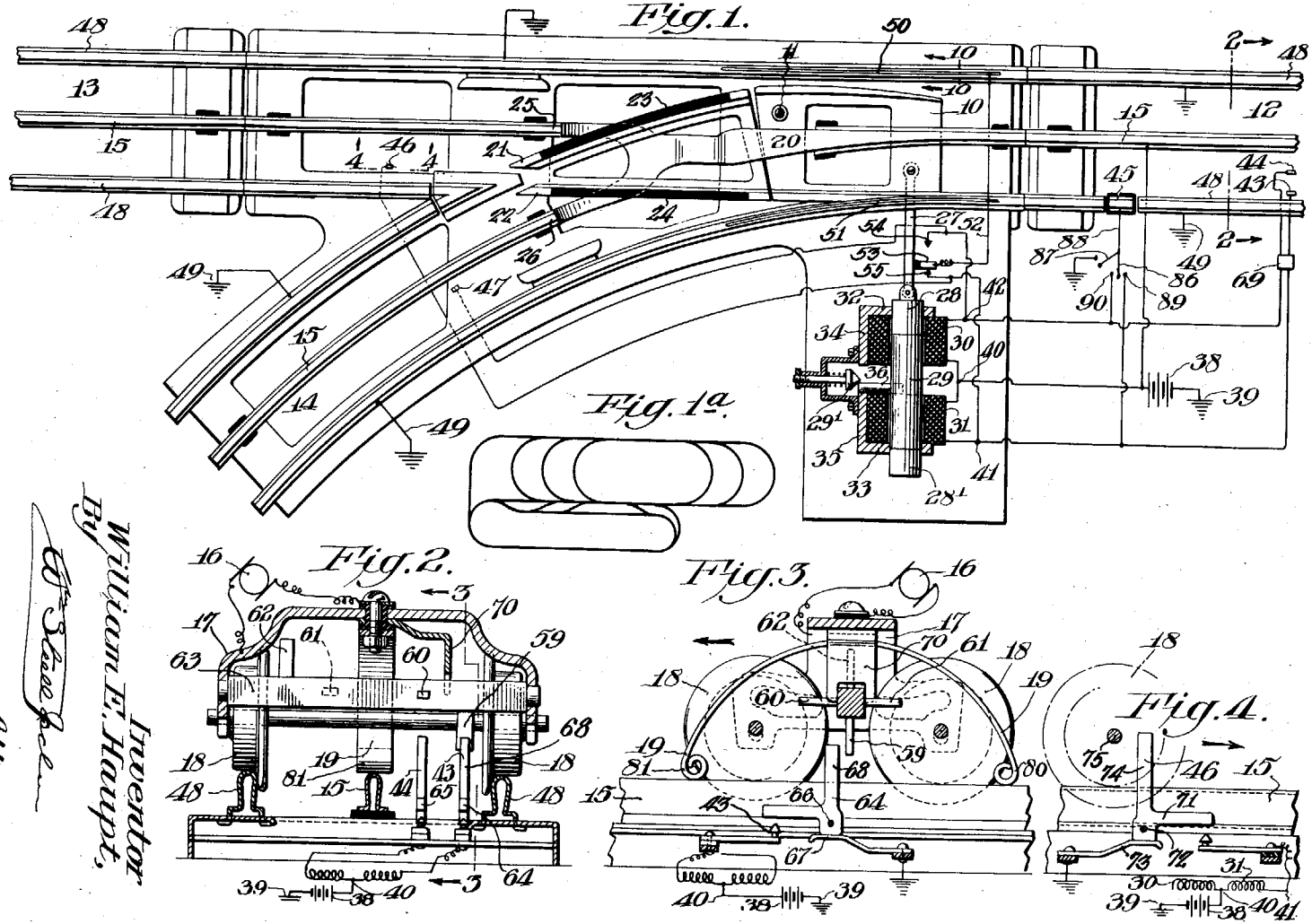
Inventor
William E. Haupt,
By
Attorney.

June 25, 1940. W. E. HAUPT Re. 21,488

TOY RAILWAY SWITCH THROWING MECHANISM

Original Filed Aug. 8, 1928 2 Sheets-Sheet 2

Inventor
William E. Haupt,
By C. Steele Gehm
Attorney.

Reissued June 25, 1940 Re. 21,488

UNITED STATES PATENT OFFICE 21,488

TOY RAILWAY SWITCH THROWING MECHANISM

William E. Haupt, Eddystone, Pa., assignor, by direct and mesne assignments, to The Lionel Corporation, New York, N. Y., a corporation of New York Original No. 2,079,251, dated May 4, 1937, Serial No. 298,265, August 8, 1928. Application for reissue April 5, 1939, Serial No. 266,234

30 Claims. (Cl. 246—231)

My invention relates to electric switch equipment for toy electric trains.

A purpose of my invention is to provide equipment of the character indicated that will be adapted to greater flexibility and sureness of switch control by the trains themselves.

A further purpose is to provide electrical means for operating a toy train switch automatically using electrical circuits closed by the trains when they approach the switch from one of the branch lines to prevent derailing if improperly set.

A further purpose is to provide an electric lock operative to keep a toy train switch locked during the passage of the train over the switch and that leaves the switch free to be operated electrically when the train is not at the switch.

A further purpose is to provide a toy railroad with alternative desirable forms of railroad switch-operating circuits and alternative desirable forms of electric contact members.

A further purpose is to provide a toy railroad with a desirable form of switch operating solenoid magnet.

Further purposes will appear in the specification and in the claims.

I have elected to show one main form only, with minor detail modifications of my invention, selecting a form that is practical and efficient in operation and which well illustrates the principles involved.

Figure 1 is a diagrammatic plan view showing a section of track including a switch with a single track on one side and two tracks on the other side, the switch being adapted to connect the single track before the switch alternatively to either track after the switch, with electrical connections embodying one form of my invention for operating the switch by the travel of the trains as modified by the hand operation of an operator.

In Figure 1*a* I have shown diagrammatically by single lines and to much reduced scale indicating the tracks, a plurality of tracks, loops and switch locations representing any one of a great variety of settings in which my invention may be used.

Figure 2 is a section taken upon the line 2—2 of Figure 1, showing a wheel element of a train and contact equipment of my invention, both not shown in Figure 1, carrying selectively adjustable contact members upon the train.

Figure 3 is a vertical section taken upon the line 3—3 of Figure 2.

Figure 4 is a vertical section taken upon the line 4—4 of Figure 1.

Figure 10:
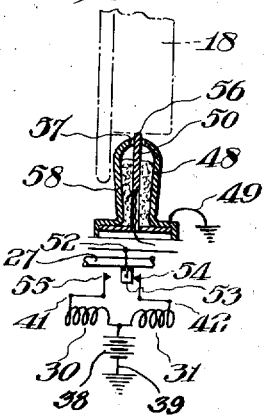
Figure 11:
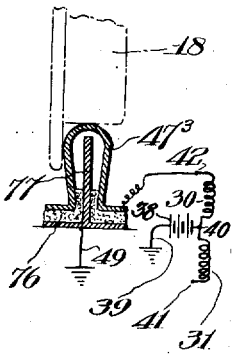

Figures 10 and 11 are enlarged sections through a rail and rail contact member, adapted to close a circuit to operate or hold the switch when a train wheel engages the rail at the contact member, Figure 10 showing diagrammatic electrical connections as for a section taken upon the line 10—10 of Figure 1 and Figure 11 having diagrammatic electrical connections as for a section upon the line 10—10 of Figure 1.

Like numerals refer to like parts in all figures.

Describing in illustration and not in limitation and referring to the drawings:

Referring to Figure 1, a switch section 10 is pivoted at 11 so as to be adapted to connect the track section 12 before the switch with either one of the track sections 13 and 14 after the switch.

A usual insulated third rail 15 is shown for feeding current to suitable motors on the trains, as indicated diagrammatically at 16 on a train element 17, the motor 16 having suitable operating connection, not shown, to the driving wheels 18 of the train and being electrically fed from the third rail by means of a suitable shoe collector 19.

The third rail portion 20 that is inside the switch section is made wider than elsewhere because the shoe collector 19 has here to travel alternatively diverging paths, the third rail being wide enough to contact with the shoe whichever branch the train takes.

The tops of the fixed rail sections 21 and 22 that cross the diverging branches of the third rail near the pivoted end of the switch 10 are insulated where they cross the diverging branches of the third rail, at 23 and 24 respectively, to avoid shorting the train motors when the shoe collectors are in simultaneous contact with the third rail and either one of the rail sections 21 or 22.

The third rail dips down underneath the fixed sections 21 and 22, forking to make connection at 25 and 26 to the third rails in the diverging track sections 13 and 14.

The switch 10 is operated by a link rod 27 which is pivotally connected at one end to the switch and at the other end to a brass rod 28 that carries an armature 29 coaxial with and adapted to be surrounded by either one of two longitudinally spaced solenoids 30 and 31.

The composite rod 28, 29, and 28₁ is desirably of uniform section and comprises brass end portions 28 and 28' and the soft-iron armature 29 between the brass ends.

The rod is longitudinally slidable in bearings 32 and 33 that may desirably be iron and form integral portions of an iron bracket for supporting the solenoids and that includes iron portions 34 and 35 which are adapted to complete the magnetic circuits when the armature is at the respective ends of its travel.

The armature 29 carries a laterally extending iron arm 36 which completes a magnetic circuit from the armature through the arm 36 and members 35 and 33 back to the armature when the solenoid 31 is energized and has pulled the armature to one end of its travel, that to connect the track sections 12 and 13; and when the solenoid 30 is energized (if solenoid 31 be then on open circuit) the armature 36 moves to the other end of its travel, stopping against the iron member 34, setting the switch to connect the track sections 12 and 14, and the magnetic circuit is completed from the armature 29 through the arm 36 and iron members 34 and 32 back to the armature.

The armature is resiliently held to place when in either one of its two set positions by a suitable spring latch member 29' so as to hold the switch to place when the solenoids are deenergized.

It will be seen that if either solenoid is energized while the other is on open circuit the armature moves into position to set the switch to one of the diverging tracks while if the other solenoid is energized and the first is on open circuit, the switch is set to the other diverging track portion.

A suitable source of current, such as a battery 38 has one terminal grounded at 39 and its other terminal electrically connected at 40 to the adjoining terminals of both solenoids.

The other terminals 41 and 42 respectively of the solenoids are connected preferably alternatively, to different contact members 43, 44 and 45 before the switch on the single track portion 12, and are respectively electrically connected to contact members 46 and 47 in the diverging tracks 13 and 14.

Neither solenoid can pull the armature away from the other while the other is energized and either can pull it from the other if the other is not energized.

The track rails 48 are also grounded, at 49.

It will be evident that, with the connections indicated, grounding any one of the contact members 43, 44, 45, 46 or 47 will energize one or other of the solenoid coils 30 and 31, definitely setting the switch 10 to one branch track or the other during the period of grounding. My invention is directed to very considerable extent to the indicated electric circuits and the cooperating contact members adapting the circuits to be selectively closed by the passing of the trains as modified by selective hand setting of contact members not on the train.

One of the other important features of my invention is directed at the electrical connections for maintaining the setting of the switch whenever a train is on the switch.

I accomplish this by making the train close an electric circuit through the solenoid to which the armature 29 and arm 36 are set, positioning the switch to its set position, as long as the train is on the switch. I preferably at this time energize only one of the solenoids but in special cases may energize both solenoids as the hold of the solenoid to which the arm 36 is temporarily adjacent far overbalances the weak pull of the other solenoid.

The term positioning as used in the specification and claims is intended to mean firmly positioning in right position for the performance of its switch function. Setting thus involves shifting to and holding in right position if the switch is first out of right position or, if the switch is already in right position, positioning the switch involves merely holding it in its set position for the insured right performance of its switch function.

I mount contact members 50 and 51 in the fixed rails along opposite sides of the switch (Figures 1 and 10).

Both members 50 and 51 are electrically connected at 52 to a contact 53 having insulated mounting on the switch operating rod 27 and which engages either at 54 with a contact connected with the solenoid 30 when the switch is set to the branch track 14, or at 55 with a contact connected with the solenoid 31 when the switch is set to the branch track 13.

When a train is at the switch it is always on one or both of the contact members 50 and 51 grounding the engaged contact member or members in any suitable way that is adapted to close an electric circuit through one or other of the solenoids 30 or 31 according to the position of the switch, so that the energized solenoid holds the switch in its set position.

In Figure 10 the contact member 50 is mounted inside the grounded rail 48 so as to present its upper surface 56 normally above the top of the rail, which is suitably slotted at 57 to pass the top of the member 50.

Insulation resilient support, which may be soft rubber, is indicated at 58.

The train wheels 18 depress the member 50 even with the top of the rail 48, grounding it through the wheel to the rail.

The contact members 43 and 44 are adapted to be grounded when the train is traveling along the single track portion 12 toward the switch 10 by cooperating contact members 59, 60, 61, and 62 that extend radially from an angularly adjustable transverse horizontal shaft member 63 upon the train and cooperating grounded rocker members 64 and 65.

The grounded rocker members 64 and 65 are alike. Each is pivoted at 66 and spring-pressed at 67 to maintain an arm 68 in the path of one of the members 59, 60, 61 or 62 on the shaft 63, provided the shaft 63 has a proper angular setting, and the train is traveling toward the switch.

Preferably when the train is traveling away from the switch 10 on to the single track 12, it fails to effect grounding of either of the terminals 43 and 44 as this might tend to throw the switch while the rearward cars of the train were still passing over it, which is obviously undesirable and under some conditions might derail the train.

In Figures 2 and 3 the train element is traveling from the left of the track 12 toward the switch 10 and the shaft member 63 is set so that its arm 59 is turned down into position to engage and deflect the grounded rocker 64 into the insulated spring contact 43 which will energize one or other of the solenoids according to the setting of a suitable fourway electric switch member 69.

The shaft member 63 is adapted to be set at each one of four angularly different positions, by means of a spring catch 70. These positions are angularly spaced 90° and at each position one of the four longitudinally and angularly spaced projections 59, 60, 61, and 62 is down, one of the other projections straight up and the other two projections extending horizontal in opposite directions.

The members 59 and 60 are for use in selectively grounding the contacts 43 and 44 respectively when the train element carrying the shaft 63 is traveling forward toward the switch, and the members 62 and 61 are for use in grounding the contacts 43 and 44 respectively when the train is backing toward the switch 10.

The shaft member 63 is set selectively in any one of the four positions, according to which contact member 43 or 44 is to be grounded and according to whether the train is moving forward toward the switch or backing toward the switch.

The contact members upon the shaft member 63 are angularly spaced 90° with respect to one another so as to avoid any interference or operation of any one of the members except the one that is turned down.

The contact member 45 is illustrated as a short rail section normally insulated from the adjoining grounded rail sections but electrically connected thereto through train wheels when the train wheels (which are metal) roll on or off the section, and also (unless the train wheels are insulated) electrically connected to the opposite rail through the train as long as any train wheel is engaging the section.

If desired the same type of contact member may be used at 45 as is shown at 43 and 44.

Inasmuch as the contact member 45 is nearer the switch 10 than the members 43 and 44 and is grounded by a train traveling toward the switch after any grounding of the latter members, the member 45 will determine the ultimate setting of the switch providing it is connected to either one of the solenoids 30 or 31.

The contact member 47 when grounded will set the switch 10 so as to join the tracks 12 and 14 while if the contact member 46 is grounded the switch is set to join the track sections 12 and 13, and these contacts are respectively grounded whenever trains approach the switch from along the respective branch tracks, thereby properly setting the switch for the trains whenever the switch is not already properly set.

In Figures 1 to 4, the contact members at 46 and 47 are alike, in general accord with those shown at 43 and 44 and adapted to be grounded by the train when the train is traveling toward the switch but not to ground when the train is traveling in the reverse direction, the structure being shown in Figure 4 for the contact member 46.

The spring contact 46 comprises a grounded rocker member 71, which is pivoted at 72, spring-pressed at 73 to maintain an arm 74 in position to be engaged by a suitable member or members 75 on the train, so as to be deflected away from the contact 46 if the train is traveling away from the switch.

The member or members 75 may be the wheel axles of the cars and engine or may be a portion of the shaft 63 out of line with any of the projections cooperating with the members 43 and 44.

It is obvious that the cooperating connections on trains and on the track for grounding the different contacts 43, 44, 45, 46, 47, 50 and 51 may be widely variant.

Figures 5 to 9 show a few of the many different other ways in which I may effect circuit closure for electrical operation of the switch 10 as the train passes the designated points on the track near the switch.

Figure 5:
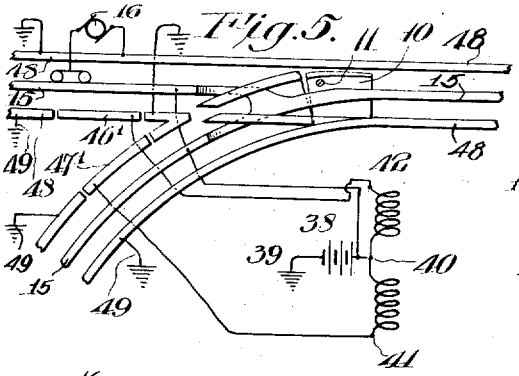
Figures 5 to 9 are diagrammatic fragmentary views illustrating different forms of electric connections for the setting of the switch by the approach of the train from the two-track side of the switch, each form being perhaps under some conditions preferable to any of the others.

In Figure 5 the contact members 46' and 47' comprise insulated sections of one of the rails 48. These sections are connected respectively to the terminals 42 and 41 of the two solenoids as in Figure 1 and the grounding is effected by the train wheels to the adjacent track sections when the wheels roll on and off the sections, and during the periods that any wheel is on the section, up through the wheel and train to the other rail, and to grounded portions of the same rail away from the insulated section.

The form of connection of Figure 5 is advantageous in that it avoids any moving parts and requires no change whatever in the construction of toy trains of the proper gauge, but is less economical of current than the form of Figures 1 to 4 in that it grounds the contact members when the trains are traveling away from the switch 10 as well as when they are traveling toward the switch 10 and therefore at times energizes the solenoid without need.

Figure 6:
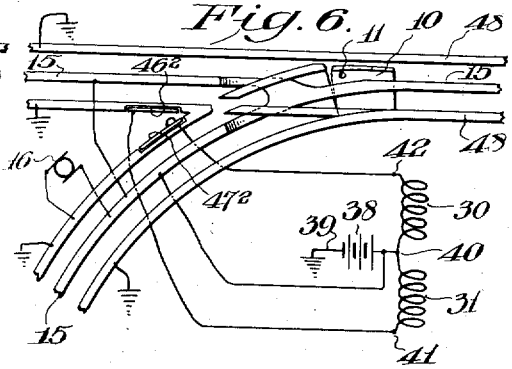

In Figure 6 the contact sections $46^2$ and $47^2$ are suitable rail insets parallel to and insulated from the adjacent grounded rails 48, and normally spring pressed upwardly so that the proper solenoid circuit is closed by the wheel depressing the contact section through the faces of the train wheels in the form shown in Figure 10 or by suitable engagement of the depressed member with a stationary member as indicated in Figure 11, either the deflecting member or the stationary member being connected to the proper solenoid circuit and the other connected to ground.

In Figure 11 an insulated rail section $47^3$ is electrically connected to the proper solenoid coil at 42 and resiliently supported upon a soft rubber cushion 76 from an inverted grounded T-member 77 that may be rigidly fastened to adjoining rail sections.

The train wheel 18 effects grounding by depressing the rail section $47^3$ onto the inverted T-member 77.

Figure 7:
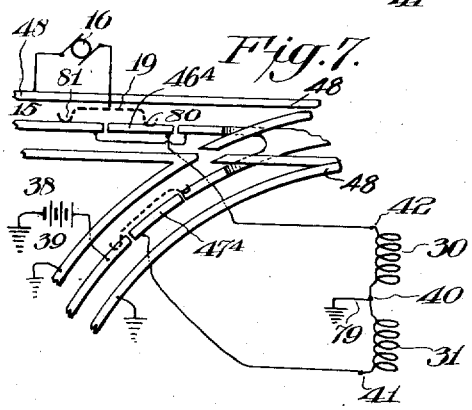

In Figure 7 the contact members $46^4$ and $47^4$ are insulated insets between interrupted sections of the third rail in the respective branch tracks, and as in the other forms are electrically connected to the terminals 41 and 42 of the respective solenoids.

The common terminal 40 of the solenoids is grounded at 79 instead of going to the battery terminal, which connects as before to the third rails.

The distance between the interrupted third rail sections is less than that between the spaced shoes 80 and 81 of the current collector 19 in order that the collector may be in continuous electrical connection with the third rail 15.

As a train is traveling toward the switch along one of the branch tracks, the forward shoe 80 engages the insulated contact member $46^4$ while the other contact member is still on the rearward section of the third rail and subsequently when the rearward shoe 81 reaches the intermediate member $46^4$ the forward shoe 80 is already on the forward section of the third rail so that there are two periods of train travel, each having the length of the member $46^4$ in which the member $46^4$ is electrically connected through the collector 19 to the third rail and during which the third rail is therefore grounded through the solenoid coil 30, to set the switch.

Figure 8:
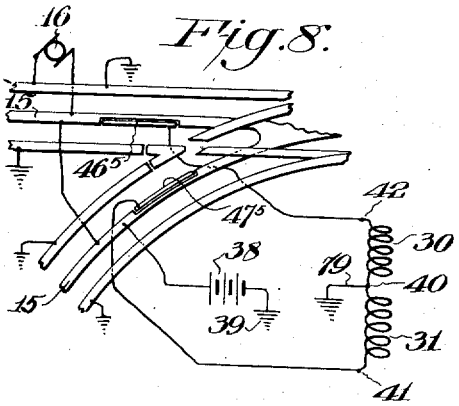

Figure 8 shows the same arrangement as in Figure 7 except that the insulated contact members $46^5$ and $47^5$ are inset into an uninterrupted third rail in the same way that the members $46^2$ and $47^2$ (Figure 6) are inset into the track rails.

It will be evident that I have not attempted to show all the different forms in which the train carried contact may be made effective to throw the switch. This would be impossible as the number is very great. However, I have tried to show a few representative mechanical and electrical ways of causing energization of the proper solenoid and wish these forms to be considered merely as suggestive.

Usually the circuit for the motor that operates the trains runs from the energized third rail to the motor and thence returns through the metal train to the grounded rails, thence to the grounded terminal of the battery, the other terminal of the battery being connected to the third rail.

Figure 9:
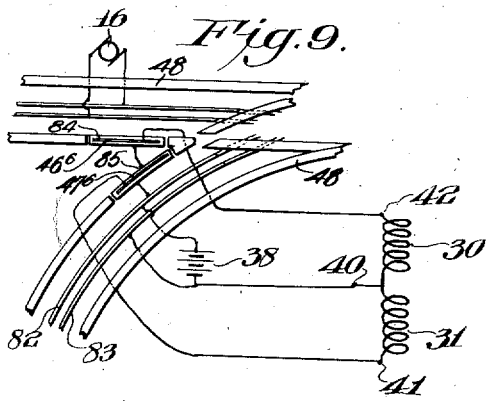

It may sometimes be desirable to use parallel bus rails 82 and 83 as indicated in Figure 9 for operating the driving motor of the train, in which case the motor return circuit does not go into the rails.

I show this in Figure 9. The contact members $46^6$ and $47^6$ are inset members corresponding to the members 50 and 51 of Figures 1 and 10 in insulated rail sections 84 and 85 that are electrically connected to one of the bus bars, as 82, the other bus bar 83 being connected to the terminal 40 common to both solenoids.

The contact members $46^6$ and $47^6$ are respectively connected to the outer terminals 42 and 41 of the solenoids.

A train approaching the switch along the track 13 electrically connects the contact members 84 and $46^6$ electrically connecting the live bus bars through the solenoid 30, and a train approaching the switch along the track 14 electrically connects the live bus bars through the solenoid 31, in each case insuring a proper setting of the switch when the train reaches it.

In practice the track of the toy railway may contain many switches adapting the trains to travel in any desired number of different ways from one point to a subsequent return to the same point, and it will be understood that each one of these switches may be provided with any or all of the features disclosed for the single switch illustrated in the figures. By the means of the reverse switch 69 the same presetting upon the train may throw all of the switches in the same direction or vary the direction of switch-throwing.

In operation a manipulator may or may not operate at a single switch only, making selective settings on the different trains so that they normally take different paths at given switches but are adapted to be sent one way or another by hand manipulation at the contact members 86 and 87.

The wire connection 88 (Figure 1) from the section 45 is adapted to be grounded at 87 and also at 86 is adapted to be connected alternatively to terminals 89 and 90 that are electrically connected respectively to the solenoid terminals 41 and 42, so that a manipulator can electrically operate or definitely set the switch 10 by grounding the section 45 at 87 and operating the movable contact member 86 to ground either one of the solenoid coil terminals 41 and 42 after which any grounding of either of the contacts 43 and 44 does not affect the switch, in that the switch is already set and held to position by an energized coil 30 or 31.

If the grounding contact at 87 is left open, a manipulator may at 86 connect the section 45 to either solenoid to energize the solenoid while the train passes over and grounds the section 45.

In this event the switch 10 might be set first by the contact 43 or 44, whichever is grounded by the passing of the train and then subsequently set by reason of the subsequent passing of the train over the contact 45, provided that the manipulator is maintaining the section 44 in connection with one or other of the solenoid terminals 41 or 42.

If the contact member 87 is grounded the manipulator is free to operate the switches by throwing the member 86 to the contacts 89 and 90 or to place the contact member 86 in an intermediate position so as to permit the operation of the contacts 43 and 44 to send the trains variantly along different branches, according to the settings upon the individual trains.

By reversing the fourway electric switch 69 the operation of all of the settings upon the individual trains will be reversed.

Obviously the selective contact members carried by the train may be at each end of the train, as upon the engine at one end and upon a caboose or other car at the other end, thus adapting the train to set a switch when backing toward the switch or going forward toward the switch, either or both, and very wide variations in the operations of the trains, both automatic and by hand control at the contact members 86 and 87, is readily obtainable.

The reversing switch 69 and the electrically operated switch 86 can both be hand-thrown by levers which show by their position the solenoidal circuits to which they correspond, i. e. the normal track switch throwing which would be caused by them and which can be varied in the case of the reversing switch 69 as indicated by different setting on the train.

If the switch 87 be closed to ground the operating switch 86 becomes operative when thrown and does not require the presence of a train upon the track to complete its throwing operation. It energizes the solenoid, but, of course, will not throw the switch if the switch is already in the position to which this energization corresponds, or if the other solenoid winding is already energized and is holding the armature.

It will be seen that switches 69 and 86 considerably overlap in their functions in that each makes it possible to throw a train to one track that but for its setting would otherwise go upon the other track, but they differ in that switch 86 forms a master switch which determines the track to which trains coming from the single track end of the switch will pass, whereas switch 69 merely reverses the initial train setting and would turn to different tracks trains having different initial setting. If but one train setting were used the switch 69 would accomplish merely what the switch 86 accomplishes when switch 87 is open.

In so far as the present invention relates to means for automatically shifting the switching member or switch tongue 10 to place the rail elements thereof in position to guide the train trucks from a branch track to the common or main track, it is possible to embody the same in a unitary track switch section of conventional external form and interchangeable with the usual track sections and track switch sections of toy railroad track layouts. At the left of Figure 1 appears a fragmentary showing of the wheel bearing and third rails and one of the crossties of a conventional 3-rail toy railroad track section, while at the right is a similar fragmentary showing of a track section modified to embody the insulating contact 45. The parts between the fragmentary showing of these track sections are embodied in a structure which is physically interchangeable with the conventional track switch section in common use on toy railroads, as shown, for example, in Caruso Patent 1,919,-272 granted July 25, 1933 on application filed March 5, 1927. It is therefore possible to obtain the interchangeable track switch section with anti-derailing controls by incorporating in it one of the switch contacts 46, 46$^1$, 46$^2$, 46$^4$, 46$^5$, 46$^6$ and one of the switch contacts 47, 47$^1$, 47$^2$, 47$^3$, 47$^4$, 47$^5$, 47$^6$, depending upon the mode of operation desired, and wire the same to the coils.

The present invention therefore provides a unitary track switch section carrying the main and branch tracks, the guiding rails, the switch tongue, the switch tongue operating means, and electrical controls to place the switch tongue in the proper position to receive the trucks of the train. This unitary track switch section can be completely assembled at the factory and inserted into the track layout without extraneous control for the switch tongue operation means.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my invention.

Having thus described my invention, what I claim as new and desire to secure by Letters Patent is:

1. In a toy railroad, a switch from a single track to alternative branch tracks, a pair of oppositely acting electromagnets connected to oppositely position the switch, electrical circuits for the magnets and connections thereof on the tracks at points spaced from the switch adapted to selectively close the magnet circuits by the passage of the train toward the switch at the said points, and electrical connections adapted to be closed by and during the passage of a train over the switch for energizing the said magnets selectively and thereafter for holding the switch in its set position while the train is on the switch.

2. In a toy railroad, a switch, a single track connected to one end thereof and branch tracks to which the switch is adapted to connect its other end alternately, a pair of electric circuits each including means respectively adapted to hold the switch to the one branch track or to the other branch track, and contact connections in the respective circuits at the switch adapted to be closed by a train on the switch.

3. In a toy railroad, a switch, a single track connected to one end thereof and branch tracks to which the switch is adapted to connect its other end alternately, a pair of electric circuits each including means respectively adapted to hold the switch to the one branch track or to the other branch track and contact connections at the switch respectively closed by a train on the switch and when closed, closing the one circuit when the switch is set to the one branch track and closing the other circuit when the switch is set to the other branch track.

4. In a toy electric railway, a Y track switch, switch throw mechanism including reversely acting solenoids, one for each track at the two-track end of the switch for throwing the track switch and connections operating between the car and the track for reversely energizing the solenoids with operation of the car on the respective tracks on the two-track end of the Y toward the single track end thereof, and other connections to the said solenoids including contacts closed by the passage of a car at the switch and other contacts selectively closed by the switch according to the position thereof to selectively energize the solenoids and thereby hold the switch in its set position while the train is on the switch.

5. In a toy electric railway, a Y track switch, switch throw mechanism including reversely acting solenoids for shifting the track switch to the respective tracks at the two-track end of the switch, hand-controlled means for energizing the respective solenoids and connections operating between the car and the track for energizing the solenoids with operation of the car on the respective tracks on the two-track end of the Y toward the single track end thereof, and other connections to the said solenoids including contacts closed by the passage of a car at the switch and other contacts selectively closed by the switch according to the position thereof to selectively energize the solenoids and thereby hold the switch in its set position while the train is on the switch.

6. In a toy electric railway, a Y track switch, switch throw mechanism including reversely acting solenoids for shifting the track switch to the respective tracks at the two-track end of the switch and connections operating between the car and the track for energizing the solenoids with operation of the car on the respective tracks on the two-track end of the Y toward the single track end thereof, said connections operating through a contact carried by the car electrically connecting the track and a conductor along the track and insulated therefrom, and other connections to the said solenoids including contacts closed by the passage of a car at the switch and other contacts selectively closed by the switch according to the position thereof to selectively energize the solenoids and thereby hold the switch in its set position while the train is on the switch.

7. In a toy electric railway, a Y track switch, switch throw mechanism including reversely acting solenoids for reversely throwing the track switch and connections operating between the car and the track for energizing the respective solenoids with operation of the car from either the two-track end or the single end of the Y, said connections operating through the track, a contact along and insulated from the track and a second contact carried by the car electrically connecting the said track and first contact and other connections to the said solenoids including contacts closed by the passage of a car at the switch and other contacts selectively closed by the switch according to the position thereof to selectively energize the solenoids and thereby hold the switch in its set position while the train is on the switch.

8. In a railway, a main track with two branch tracks, a track switch with movable switch points for guiding a vehicle from the main track to either one or the other of the two branch tracks or from either branch track to the main track, a source of electric power so connected to the track as to propel the vehicle as it passes along the track, electro-magnetic means for shifting said switch points, a conducting element in each of the two rails of a branch track, insulated from each other to form the contact points of an electric switch, and circuit means operated by said electric switch as the vehicle approaches the main track from the branch track to supply current from said source through the wheels and axles of the vehicle and through the said contact elements to energize said electro-magnetic means.

9. In a railway, a main track with two branch tracks, a track switch with movable switch points for guiding a vehicle from the main track to one or the other of the two branch tracks or from either branch track to the main track, a source of electric power so connected to the track as to propel the vehicle as it passes along the track, electro-magnetic means for shifting said switch points, said electro-magnetic means having two operating windings, one for shifting the switch points in one direction and the other for shifting the switch points in the opposite direction, a conducting element in each rail of each branch track, the two conducting elements in each pair of rails insulated from each other to form the contact points of an electric switch to control one winding of the electro-magnetic means, and circuit means operated by said electric switch as the vehicle approaches the main track from either branch track to supply current from said source through the wheels and axles of the vehicle and through said conducting elements to energize the proper winding of the electro-magnetic means to automatically move the switch points to guide the vehicle from that branch track to the main track.

10. In a railway, a main track with two branch tracks, a track switch with movable switch points for guiding the vehicle from one or the other of the branch tracks to the main track or from the main track to one or the other of the branch tracks, a source of electric power so connected to the track as to propel the vehicle as it passes along the track, electro-magnetic means for shifting the switch points, a conducting element in each of the two rails of one branch track insulated from each other to form the contact points of an electric switch, and circuit means operated by said electric switch as the vehicle approaches the main track from the branch track to supply current from said source through the wheels and axles of the vehicle, and through said contact elements to control said electro-magnetic means, in combination with a hand operated electric switch also arranged to complete a circuit to control said electro-magnetic means from said source of power whereby as the contact lever is moved to touch either of two contact posts a connection is closed through the associated circuits to complete a circuit to energize said electro-magnetic means.

11. In a railway, a main track with two branch tracks, a track switch with movable switch points for guiding a vehicle from the main track to one or the other of the two branch tracks or from either branch track to the main track, a source of electric power so connected to the track as to propel the vehicle as it passes along the track, electro-magnetic means for shifting said switch points, said electro-magnetic means having two operating windings, one for shifting the switch points in one direction and the other for shifting the switch points in the opposite direction, a conducting element in each of the two rails of each branch track, the two conducting elements in each rail or rails being insulated from each other, to form the contact points of an electric switch to control one winding of the electro-magnetic means and circuit means operated by said electric switch as the vehicle approaches the main track from either branch track, to supply current from said power source through the wheels and axles of the vehicle and through the said conducting elements to energize the proper winding of said electro-magnetic means to automatically shift the switch points to guide the vehicle from that branch track to the main track, in combination with a hand operated electric switch with a movable switch lever arranged to make contact with one or the other of the two contact posts to complete circuits to control said electro-magnetic means from said source of power whereby as the contact lever is moved to touch a contact post a connection is closed through the associated circuits to complete a circuit to energize said electro-magnetic means thus shifting the switch points to guide the vehicle to the track desired.

12. In an electric railway, a main track with two branches, said main track and branch tracks each comprising two rails for guiding the wheels of a vehicle and a power conductor insulated from the rails said power conductor being connected to one terminal of the power source and said rails being connected to the other terminal of the power source to act as a return conductor, whereby power may be supplied to the vehicle to propel same on the track, a switch with movable switch points for guiding a vehicle from the main track to one or the other of two branch tracks or from either branch track to the main track, electro-magnetic means for shifting said switch points, a conducting element in one rail member of one branch track, and insulated from the remainder of the rail member and from the associated rail member, a connection from the said conducting element to a terminal of said electro-magnetic means and a connection from another terminal of said electro-magnetic means to the terminal of the power source which is connected to the power conductor whereby a connection is closed through the wheels and axles of the vehicle to said conducting element and the opposite rail member of the branch track to complete a circuit to energize said electro-magnetic means.

13. In an electric railway, a main track with two branch tracks said main and branch tracks each comprising two rails for guiding the wheels of the vehicle and a power conductor insulated from the rails, said conductor being connected to one terminal of the power source and said rails being connected to another terminal of the power source to act as a power return conductor whereby the power may be supplied to the vehicle to propel the same on the track a switch with movable switch points for guiding the vehicle from the main track to one or the other of two branch tracks or from either branch track to the main track, electro-magnetic means for shifting the switch points said electro-magnetic means having two operating windings one for shifting the switch points in one direction and the other for shifting the switch points in the opposite direction, a conducting element in one rail member of each branch track and each conducting element insulated from the remainder of said rail member and from the associated rail member, a connection from one of said conducting elements to a terminal of one of the operating windings of the electro-magnetic means and a connection from the other conducting element to a terminal of the other winding of the electro-magnetic means, a connection from another terminal of each of the two operating windings of the electro-magnetic means to the terminal of the power source which is also connected to the power conductor associated with the track rails, whereby a connection is closed through the wheels and axles of the vehicle approaching the main track from either branch track to said conducting element and the opposite rail member of that branch track to complete a circuit to energize the proper winding of the electro-magnetic means to shift the switch points so as to guide the vehicle from that branch track to the main track.

14. In a toy railroad, a single track, a track switch having one end connected to the single track, branch tracks to which the switch is adapted to connect its other end alternatively, electric circuits adapted to be selectively closed to set the switch to the respective branch tracks, a contact member in the single track which is always closed by a train moving toward the switch on the track and electrical connections including a stationary hand operated electrical switch for placing the contact member at the track alternatively in either circuit, whereby a person playing with the toy railroad can determine the way in which the train will travel without stopping the train and nevertheless can have the pleasure of seeing the switch shifted automatically by a train moving toward the switch on the track.

15. In a toy railroad, a single track, a track switch having one end connected to the single track, branch tracks to which the switch is adapted to connect its other end alternatively, electric circuits adapted to be selectively closed to set the switch to the respective branch tracks, a contact member in the single track which is always closed by a train moving toward the switch on the track and electrical connections including a stationary hand operated electrical switch for placing the contact member at the track alternatively in either circuit and means for alternatively connecting the contact member to ground, whereby a person playing with the toy railroad can determine the way in which the train will travel without stopping the train and nevertheless can have the pleasure of seeing the switch shifted automatically by a train moving toward the switch on the track.

16. In a toy railroad, a single track, a track switch having one end connected to the single track, branch tracks to which the switch is adapted to connect its other end alternatively, a pair of electric circuits one of which is adapted when closed, to set the switch to one branch track and the other adapted when closed, to set the switch to the other branch track, a pair of contacts on the single track before the switch in the respective electric circuits, a train, contact members on the train adapted to selectively engage one or other of the pair of contact members in order to set the switch to one branch or the other according to the selective adjustment on the train, electrical connections including another contact member on the single track nearer to the switch than the pair of contact members and including a hand adjustment adapted to place the said other contact member into either of the circuits at will and the said other contact member being adapted to cooperate with the train so that the passage of the train effects circuit closure at the contact member nearer the switch to set the switch either way, according to the position of the hand adjustment, whereby the action of the contact member on the train in setting the switch may be countermanded at will by the hand adjustment.

17. In a toy railroad, a single track, a mechanical switch having one end connected to the single track, branch tracks to which the rail sections of the switch connect at the other end of the switch, an electric circuit having a contact on one branch track and including electro-magnetic means in the circuit adapting closure of the circuit to shift the switch when it is otherwise thrown and position the switch to the said one branch track, in combination with means on a train for closing the circuit at the contact when the train is approaching the switch along the said one branch track, a second circuit adapted to be closed by the presence of a train on the switch and including the electromagnetic means of the said first circuit adapted with closure of the said second circuit to hold the switch in the position determined by the first circuit and a contact means actuated by the switch for energizing the electromagnetic means when a train is on the switch.

18. In a toy railroad, a single track, a mechanical switch having one end connected to the single track, branch tracks to which the rail sections of the switch connect at the other end of the switch, a switch point adapted to guide trains from the single track to either branch track or vice versa, an electric circuit having a contact on one branch track and including electromagnetic means adapting closure of the circuit to shift the switch point when it is in one position and a second electric circuit having a contact in the other branch track and including electromagnetic means adapted when closed to shift the switch point when it is in the other position, in combination with means on a train for closing the respective circuits at the respective contacts when the train approaches the switch along the respective branch tracks, a third circuit adapted to be closed by the presence of a train on the switch and including the means of the first or second circuit for respectively positioning the switch in its limiting positions and means adapting the switch by its position to selectively determine which of the alternative means is effectively included in the said third circuit.

19. In a toy railroad, a single track, a mechanical switch having one end connected to the single track, branch tracks to which the rail sections of the switch connect at the other end of the switch, a rail section in one of the branch tracks insulated from the adjoining rail sections, an electric circuit adapted to be closed by electrically connecting the insulated section to the adjoining sections and including electromagnetic means in the circuit adapting closure of the circuit to shift the switch when it is otherwise thrown and position the switch to the said one branch track, the passage of a train over the insulating section completing the circuit to set the switch to the said one branch track, a second circuit adapted to be closed by the presence of a train on the mechanical switch and including said electromagnetic means to hold the switch in its limiting position and means adapting the mechanical switch by its own position to complete the said second circuit through said electromagnetic means.

20. In a toy railroad for electric trains, a single track, a mechanical switch having one end connected to the single track, branch tracks to which the rail sections of the switch connect at the other end of the switch, a third rail along one of the branch tracks for feeding current for operating the train, a contact member mounted in the third rail and insulated therefrom and adapted to be electrically connected to the third rail by a collecting shoe of the train when the train passes over the branch track toward the switch, in combination with an electric circuit including the third rail and the contact member and adapted to be closed by any electric connection between the third rail and contact member and including electromagnetic means adapting closure of the circuit to shift the switch when it is otherwise thrown and position the switch to the said one branch track, a second circuit adapted to be closed by the presence of a train on the mechanical switch and including said electromagnetic means adapted with closure of the second circuit to hold the switch in its limiting position, and means adapting the mechanical switch by its own position to complete the said second circuit through said electromagnetic means.

21. In a toy electric railway, a Y track switch, switch throw mechanism including reversely acting solenoids for reversely throwing the track switch and connections operating between the car and the track for energizing the respective solenoids with operation of the car from the two-track end of the Y toward the single track end thereof, said connections operating through relatively insulated relatively movable normally spaced contacts along the track brought together by mechanism of the car during the passage thereof, and other connections to the said solenoids including other contacts closed by the passage of a car at the switch and yet other contacts selectively closed by the switch according to the position thereof to selectively energize the solenoids and thereby hold the switch in its set position while the train is on the switch.

22. As an article of manufacture, a unitary track switch section for toy electric trains adapted to be interchangeable with the usual toy track sections to permit the usual uninterrupted electric travel of a train from either of two branch tracks to a main track, or vice versa, said unitary track switch section comprising power rails in the main track end of the section and the branch track ends of the section, a movable switch tongue, wheel guiding rails which together with the movable switch tongue guide the wheels of the train trucks, a source of propulsion current connected to the power rails and to at least one of the wheel guiding rails in each branch to afford a power supply throughout the length of the track switch section, electromagnetic means for shifting the switch tongue back and forth and having an electrical connection with one side of the current supply circuit, conducting elements carried by the track switch section, one for each of the branch tracks, each conducting element being normally in open circuit relation with the other side of the propulsion current supply circuit, and being connected to the electromagnetic means to shift the switch tongue to bring the corresponding rail thereof into alignment with the proper wheel guiding rail of the corresponding branch track, and means responsive to the passage of a truck along either of said branch tracks to effect a closing of the circuit through the corresponding conducting element whereby the electromagnetic means is energized.

23. The article of manufacture claimed in claim 22, wherein each of the conducting elements is in the form of an insulated portion of one of the wheel guiding rails.

24. The article of manufacture claimed in claim 22, wherein the conducting element is closely adjacent, but insulated from the power rail and adapted to be contacted by a train carried current collector bearing on the power rail.

25. The article of manufacture claimed in claim 22, wherein the conducting element is spring pressed toward open circuit position and is moved to circuit closing position by the load of the passing trucks of the train.

26. An article of manufacture such as claimed in claim 22, wherein the electromagnetic means comprises two solenoid coils, each connected to the corresponding conducting element, and an armature connected to the switch tongue.

27. In a railway, a main track with two branch tracks, a track switch with movable switch points for guiding a vehicle from the main track to either one or the other of the two branch tracks or from either branch track to the main track, a source of propulsion current connected to the track to propel the vehicle as it passes along the track, propulsion current operated electromagnetic means for shifting said switch points, a conducting element adjacent a rail of each of the branch tracks, the conducting elements being spring pressed toward open position and insulated from each other to form the contact points of an electric switch, and circuit means operated by said electric switch as the vehicle approaches the main track from the branch track to depress the corresponding conducting element to circuit closing position and complete the circuit through the electromagnetic means and source.

28. In a toy railroad, rails forming main and branch tracks, a track switch adapted to connect the main and branch tracks selectively, an electric circuit when closed adapted electrically to set the switch to one of said branch tracks, a second circuit adapted electrically to set the switch to the other branch track, a plurality of means located respectively in the two branch tracks through which connection is made respectively one to one circuit and the other to the other circuit, electrical mechanism at the switch for holding the switch in set position when the train is on the switch and including mechanism on the train adapted to energize one of said circuits and not to energize the other of said circuits and means on the train for operating the said respective means as the train approaches the switch along the respective branch tracks to insure proper setting of the switch from the branch track to the main track.

29. In a toy railroad, rails comprising a single track, rails comprising each of two branching tracks therefrom, a mechanical switch adapted to connect either said branch track with the single track, separate electrical circuits adapted when actuated to throw the switch in one direction or in the other direction, mechanically operated electric switches located between the rails of the single track, adapted when actuated to close one or other of said circuits, the switches spaced from one another transversely of the track and so located at different distances across the track in which they are placed that the distances of each switch from the respective rails are materially different from each of the distances of the other from the respective rails, and operating means carried by a train and comprising a transversely extending shaft having radial arms thereon spaced from one another longitudinally of and angularly about the shaft and the shaft and its arms located in position for one arm in one angular position of the shaft to engage one of said switches in one direction of train travel and to be free from engagement with either switch in an opposite direction of train travel, and for the other arm in another angular position of the shaft to engage the other of said switches in one direction of train travel and to be free from engagement with either switch in the opposite direction of train travel.

30. In a toy railroad, rails forming main and branch tracks, a track switch having a shiftable switch tongue adapted to connect the main and branch tracks selectively, a third rail extending through the main and branch tracks, electrical circuits for the respective branch tracks each including a two coil electromagnetic device for controlling the position of the track switch tongue, the separate circuits each including circuit closing means in the branch and main line tracks respectively each comprising an insulated track rail adapted to be grounded by the running gear of a vehicle on said track, a lead connected to said insulated track rail and to a coil of the electromagnet, and a lead connecting the third rail to the other ends of the coils.

WILLIAM E. HAUPT.